United States Patent [19]

Fitts

[11] Patent Number: 5,175,601
[45] Date of Patent: Dec. 29, 1992

[54] HIGH-SPEED 3-D SURFACE MEASUREMENT SURFACE INSPECTION AND REVERSE-CAD SYSTEM

[75] Inventor: John M. Fitts, Santa Monica, Calif.
[73] Assignee: Electro-Optical Information Systems, Santa Monica, Calif.
[21] Appl. No.: 775,432
[22] Filed: Oct. 15, 1991
[51] Int. Cl.⁵ ............................................. G01B 11/24
[52] U.S. Cl. ................................. 356/376; 250/237 G
[58] Field of Search ................................. 356/376, 375; 250/237 G

[56] References Cited

U.S. PATENT DOCUMENTS

| | | |
|---|---|---|
| 3,166,624 | 1/1965 | Vargady . |
| 3,627,427 | 12/1971 | Johnson et al. . |
| 3,943,278 | 3/1976 | Ramsey, Jr. . |
| 4,051,483 | 9/1977 | Suzuki ............................. 356/2 |
| 4,070,683 | 1/1978 | Altschuler et al. ................. 356/2 |
| 4,212,073 | 7/1980 | Balasubramanian ............... 356/376 |
| 4,273,448 | 6/1981 | Schiler ........................... 250/237 G |
| 4,459,027 | 7/1984 | Kafri et al. ....................... 356/376 |
| 4,525,858 | 6/1985 | Cline et al. ....................... 356/376 |
| 4,577,940 | 3/1986 | Krasinski et al. ................. 356/376 |
| 4,664,470 | 5/1987 | Yerazunis ........................ 356/376 |
| 4,675,730 | 6/1987 | Adomaitis et al. ................ 358/106 |
| 4,742,237 | 5/1988 | Ozawa ............................ 356/376 |
| 4,794,550 | 12/1988 | Greivenkamp, Jr. ............... 356/357 |
| 4,803,645 | 2/1989 | Ohtomo et al. ................... 356/376 |
| 4,810,895 | 3/1989 | Kafri et al. ....................... 250/571 |
| 4,813,761 | 3/1989 | Davis et al. . |
| 4,814,601 | 3/1989 | Jones ........................... 356/237 R |
| 4,834,530 | 5/1989 | Murai et al. ..................... 356/376 |
| 4,836,681 | 6/1989 | Van Saders et al. ............... 356/374 |
| 4,842,411 | 6/1989 | Wood ............................ 356/376 |
| 4,850,673 | 7/1989 | Velzel et al. .................... 250/237 G |
| 4,850,650 | 7/1989 | Deason et al. ................... 356/35.5 |
| 4,867,570 | 9/1989 | Sorimachi et al. ................ 356/376 |
| 4,872,757 | 10/1989 | Cormack et al. .................. 356/376 |
| 4,874,955 | 10/1989 | Uesugi et al. .................... 356/376 |
| 4,877,970 | 10/1989 | Minamikawa et al. ............. 356/376 |
| 4,887,899 | 12/1989 | Hung ............................. 356/353 |
| 4,895,434 | 1/1990 | Stern et al. . |
| 4,895,448 | 1/1990 | Laird ............................ 356/376 |
| 4,900,144 | 2/1990 | Kobayashi ....................... 356/376 |
| 4,904,084 | 2/1990 | Geary ........................... 356/360 |
| 4,928,169 | 5/1990 | Leberl et al. ..................... 358/93 |
| 4,929,083 | 5/1990 | Brunner ......................... 356/400 |
| 4,939,368 | 7/1990 | Brown ........................... 356/354 |
| 4,939,380 | 7/1990 | Berger et al. .................... 250/237 G |
| 4,948,258 | 8/1990 | Caimi ............................ 356/376 |

OTHER PUBLICATIONS

"Fourier-Transform Method Of Fringe-Pattern Analysis For Computer-Based Topography And Interferometry", by Takeda et al., J.Opt.Soc.Am/vol. 72, No. 1, Jan. 1982, pp. 156–160.

"Fourier Transform Profilometry For The Automatic Measurement Of 3-D Object Shapes", by Takeda et al., Applied Optics, vol. 22, No. 24, Dec. 15, 1983, pp. 3977–3982.

"Automted Phase Measuring Profilometry Of 3-D Diffuse Objects", by V. Srinivasan, et al., Applied Optics, vol. 23, No. 18, Sep. 15, 1984, pp. 3105–3108.

Primary Examiner—F. L. Evans
Attorney, Agent, or Firm—Hill, Van Santen, Steadman & Simpson

[57] ABSTRACT

This invention relates to an apparatus and method for 3-D vision sensing or measurement to rapidly collect X-Y-Z surface data to support dimensional measurement, surface inspection and Reverse-CAD functions. The high-speed three-dimensional surface measurement system for use in determining the surface of an object from at least two electronic signals, has at least a first source for illuminating at least a surface area of the object with at least one fringe pattern. At least two cameras are provided for receiving reflected illumination from the surface area, each of the at least two cameras have a predetermined spacial orientation relative to the source for illuminating, a primary camera of the two cameras having a line-of-sight that forms a primary angle relative to a line-of-sight of the source for illuminating and a secondary camera of the two cameras having a line-of-sight that forms a secondary angle relative to the line-of-sight of the source for illuminating, the secondary angle being different than the primary angle. The primary camera provides a primary electronic signal representative of reflected illumination received thereby and the secondary camera providing a secondary electronic signal representative of reflected illumination received thereby.

45 Claims, 7 Drawing Sheets

| FIG.2b | FIG.2c | FIG.2d | FIG.2e | FIG.2f |
|---|---|---|---|---|
|  |  |  |  |  |

HIGH-SPEED 3-D SURFACE MEASUREMENT SURFACE INSPECTION AND REVERSE-CAD SYSTEM

BACKGROUND OF THE INVENTION

The present invention is directed to X-Y-Z data collection devices and systems. The present invention is directly applicable to many important surface inspection tasks and Reverse-CAD functions that have not been successfully accomplished in the prior art because of data collection speeds, mechanical unreliability and equipment costs.

In the prior art X-Y-Z data collection systems have been traditionally of the single-point contact probe type associated with Coordinate Measuring Machines (CMM). These CMM systems involve extensive and cumbersome X-Y-Z mechanical motions to place the probe in contact with the part to generate a single X-Y-Z data point. The speed limitations of these systems involve the motions of the mechanical units which are required to accelerate and decelerate between points in order for a light contact of the probe to be accomplished. Efforts to improve speeds have resulted in more complex and more expensive mechanical units in order to avoid the effects of mechanical wear, shock and other reliability factors. Advances in probe technology has also resulted in the development of single-point, non-contact probes based on the principles of triangulation. Although the probes no longer come in contact with the part, the extensive mechanical motions are still retained in order to collect the part data.

Additional advances in X-Y-Z data systems include laser line scanning techniques such as that described in U.S. Pat. No. 4,895,434. In these systems, a vision sensor such as a CCD video camera views an area of the part. A laser line at an offset angle is mechanically swept through the viewing area of the camera and a number of images are collected for data processing in order to generate the X-Y-Z surface information. This unit requires a finite amount of time for the camera to be held stationary with respect to the part while the laser line is mechanically scanned and the images are collected. After the data is collected, typically in one or more seconds, a positioning unit is used to either reposition the part relative to the camera or vise versa. A further advancement in sensor technology has eliminated the requirement for the mechanical scanning of the laser line. In particular, the EOIS MK VII product manufactured by Electro-Optical Information Systems, Inc. includes a projection of an array of linear lines, i.e. a linear fringe pattern onto the part for viewing by the camera. In this configuration at least two fringe patterns need to be projected sequentially to permit the camera to collect X-Y-Z data through an adequate optical depth-of-field. The second pattern can be generated by either mechanically changing the fringe pattern in the optical projector or by using a second projector to cast the pattern. This second fringe pattern is in sequence to the primary fringe pattern and requires that the camera be held stationary with respect to the part for approximately a fraction of a second. In all of these applications, a mechanical positioner is required to step between the points or fields-of-view of the cameras with the requirements of high accuracy acceleration and deceleration which create further time delays.

At the system level, the methods of improving overall functional speeds involve a "thinning" of data for less data collection. This method, however, has made the data collection systems less usable for surface inspection applications in which detailed surface characteristics and flaws are to be measured and in Reverse-CAD operations in which extensive surface details are to be measured and stored.

One of the most significant problems in high-speed 3-D surface mapping sensors, in which fixed projection patterns are used, is the ability to generate an X-Y-Z surface map which is not only accurate over a large Z range (for nomenclature convenience, this is the axis approximately normal to the surface under measure), but which is also a high spatial resolution in X and Y (the local axes approximately tangent to the surface under measure). The prior art which includes shadow moire (U.S. Pat. Nos.: 3,627,427; 4,577,940; 4,525,858; and 4,939,380), projection moire (U.S. Pat. Nos.: 4,212,073; 3,943,278; 4,850,693; and 4,874,955), projected fringe moire (U.S. Pat. Nos.: 4,070,683; 4,867,570; and 4,842,411), does not effectively solve this problem. The fundamental methods of phase-shift moire, which have a potentially high X-Y spatial resolution, are not suitable as the grating patterns need to be shifted several times over a fringe period causing associated time delays. This is because the part needs to be held stationary during the relatively long collection interval. Fixed fringe pattern moire (whether of the shadow type, projected type, with or without camera optics reference gratings) can also achieve good surface map X-Y spatial resolution and Z accuracies if the fringe pattern is of high density. In principle, the spatial resolution in the direction of the fringes (the Y-axis) is the same as the pixel size of the CCD imaging camera. Across the fringe pattern (the X-axis) the spatial resolution is determined by the Nyquest limit established by the highest fundamental frequency of the projected pattern (which could include compound fringe patterns of several fundamental frequencies). As long as fringe pattern image contrast can be maintained in the optical system, a number of measurement advantages occur as the fringe pattern becomes more dense. These are: (1) greater surface map spatial resolution in the X-axis, (2) greater measurement sensitivity and resolution in the Z-axis, and (3) smaller measurable X-Y surface patch areas. The disadvantage of these high density patterns is that the dynamic range of the Z-axis measurement is severely limited by the fringe pattern spacing. As the surface height changes in Z, the fringe pattern shifts in the camera field-of-view. When the fundamental frequency of the fringe pattern shifts one full cycle, the information on surface location is lost. This is known as the "$2\pi$ Problem" in moire and interferometric fringe pattern processing and limits the Z-axis dynamic range of measurement to approximately the spacing of one fringe pattern cycle. A number of techniques are used to counter this problem including those of the referenced inventions, but each solution detracts from the goal of the present invention to achieve high-speed X-Y-Z surface measurement and mapping while achieving the previously identified advantages to high density fringes.

A summary of previously identified techniques to solve the $2\pi$ problem and Z-axis dynamic range problem follows. One class of techniques is to project sequentially different fringe patterns to eliminate the $2\pi$ ambiguity. However this has the same problem as the phase-shift moire techniques in that a finite time interval is required to collect the data and to hold the part stationary with respect to the sensor. For fixed pattern techniques, a common solution is to code the fringes, or to superimpose additional lower frequency fringe patterns onto the fundamental fringe pattern, or to add special "identification" artifacts to the pattern to remove the $2\pi$ ambiguity. Each of these techniques increases the Z measurement dynamic range but reduces the performance of the "stand-alone" high density fringe pattern. In order to maintain the Z accuracies of the measurements with these techniques, a more extensive image filtering process in required to reduce the potential noise or errors induced by the modified pattern features. This translates directly into requiring that the measurable X-Y surface patches to be larger than otherwise required. Thus the usefulness of these techniques are significantly reduced when high-speed 3-D measurements of small dimensional features on parts are required such as corner radii, edge contours, fillets, corrugation, serrations, etc.

SUMMARY OF THE INVENTION

The present invention avoids the paradoxes described above in the prior art by using two cameras at different positions to simultaneous view and store the high density fringe pattern. Since each camera is referenced to the projector (and hence to each other) with different but known geometries, the $2\pi$ ambiguity in the Z measurement range can be solved. All of the beneficial features of the high density moire fringe pattern are retained, as well as the high-speed measurement potential, since the part need not be held stationary with respect to the sensor.

The present invention which is based on the principles of moire processing also overcomes the X-Y spatial resolution limitations associated with two camera (or more) surface mapping systems based on stereometric/photogrammetric principles. These methods involve the viewing of "identifiable" points on a 3-D surface and measuring the X-Y-Z coordinates of these points based on knowledge of how these cameras are referenced to each other and the parallax differences of common imaged points in each camera. Since suitable identifiable points may not be available on smooth surfaces, a projector is sometimes used to optically "tag" points on the surface to be viewed by the cameras. These projected tag points are generally well spaced so as to avoid confusion of selecting "common" points for stereometric/photogrammetric processing. Consequently, the X-Y spatial resolution of the resulting X-Y-Z surface map is much less dense than that available from the high density fringe pattern associated with the present invention. The known geometric location of the projector relative to either camera is not used as part of the stereometric processing.

U.S. Pat. No. 4,842,411 issued to Wood describes a two camera stereometric sensor with a fringe pattern projector to gauge the 3-D surfaces of a part. However, the geometric orientation of the projector unit relative to the cameras are not used in the stereometric processing of the fringes. Thus the period of the fringe pattern is made quite large in order to avoid confusion in processing fringes, i.e. to avoid the $2\pi$ problem. Thus even though two cameras are used, the X-Y resolution of the surface map is much less than the present invention which utilizes the geometric orientation of the projector relative to the each of the two or more cameras which then in turn permits the use of high density fringes.

Another advantage of the present invention is that many more surface data points are processed than in the stereometric techniques which also results in much more accurate surface maps resulting from best fit and regression analysis processing.

An object of the present invention is to provide a 3-D measuring system in which X-Y-Z data can be collected in the camera field-of-view without the requirement that the sensor be held stationary with respect to the part while a measurement is being made. The technique however is still functional for stationary views as mechanical movement of the positioning system is not required to generate the X-Y-Z data.

It is a further objective of the present invention to greatly simplify the mechanical requirements of the positioning device to further increase speeds since acceleration and deceleration requirements are to be eliminated. This results in more reliable, less complex and less costly positioners.

It is yet another object of the present invention to generate data in a manner so that it is convenient to manipulate the data and reduce the data to CAD (Computer Aided Design) data files through straightforward operator interaction utilizing existing CAD software and menus (this is known as the Reverse-CAD function).

In accordance with the principles of the present invention, the above and other objectives are realized, in part, due to the sensor head and method of data collection. In its simplest form, a single projector is used to cast a linear fringe pattern on the part. The present invention includes special optical techniques for the fringe projector and CCD camera portions of the sensor to insure an enhanced image contrast to achieve the higher density fringe patterns. At least two or more solid-state CCD cameras are used to view the fringe pattern at different angles relative to the projector line-of-sight. For convenience, this primary sensor is referred to as the Fine Camera and is typically oriented with angles between 15° and 90° to the projector line-of-sight (LOS) in accordance with standard practices in triangulation technology. The second camera views approximately the same surface area from a different angular position which is somewhat arbitrary as long as its optical line-of-sight (LOS) does not exactly coincide with either the optical LOS of the Fine Camera or the optical LOS of the Projector. Typically a 3° separation or more is acceptable. For convenience, the second camera is referred to as the Coarse Camera. The data from these two cameras will generate an unambiguous X-Y-Z data pattern throughout the gauging volume of the sensor head. This gauging volume is typically the field-of-view (FOV) of the camera and approximately half the optical depth-of-field of the camera. A third camera can be used at yet another angle to provide gauging through the full optical depth-of-field of the Fine Camera. Existing video frame grabber (VFG) products permit the simultaneous digitalization and collection of the imagery. In addition, most CCD sensors currently used in measuring systems also include electronic shutters permitting "instantaneous" viewing of the object in a millisecond or less. For those cases in which the light intensity is not sufficient due to the short shutter times, a strobe light illuminator is used as part of the projector. Strobes with light pulses as short as 10 micro-seconds can be achieved with these methods. Also in daylight operations, a laser device can be used (through a fiber optic) associated with the projector with matching narrow-band optical spectral filters placed in front of the cameras. The fiber optic effectively diffuses the laser light so that when it reflects from the part, it will no longer be collimated and result in a potential eye hazard.

With this virtual instantaneous collection of imagery for X-Y-Z data processing, there is no requirement for the sensor positioning system to achieve a stationary or stable position of the camera relative to the part. Thus either the part and/or the sensor head can be continuously repositioned and moved for high-speed data coverage without the time limitations associated with mechanical acceleration and deceleration functions. Furthermore the mechanical requirements for the positioning system can be greatly reduced due to the large gauging volume and field-of-view of the sensor head. In particular, as long as the mechanical positions are recorded using standard linear and rotary encoders or other 3-D tracking devices, the precise mechanical position during data collection is not critical. The linear and rotary encoder outputs or the 3-D tracking outputs for the positioners will be entered into the computer processing system simultaneous to the camera image collection. This would permit the proper coordinate transformation of the camera X-Y-Z coordinates into a world coordinate system or part coordinate system. This property will further reduce the complexity and costs of the mechanical portions of the system, while improving speeds, since precise mechanical accuracies, repeatabilities and resolutions are not required.

As the field-of-view of the sensor head is moved to a new gauging position, the data is processed by standard computer array processors for the generation of X-Y-Z data. Therefore, the present invention has its data generation and measurement speed dependent on computer processing technology as opposed to the fundamental limits of mechanical positioning technology. The result is that existing computer technology permits much faster processing and data collection than currently accomplished with other sensor and X-Y-Z measuring systems. The continuing advancement of computer technology will further improve the data collection speeds independent of mechanical positioners speeds.

Since the present invention permits large amounts of X-Y-Z data to be measured for a part in short periods of time, an inspection process to detect flaws or to characterize small details on a large part can be implemented. The data density is typically an X-Y-Z data point for each pixel (detector element) of the CCD Fine Camera. For example, a 512×512 CCD camera generates approximately 250,000 X-Y-Z data points for each view. 1024×1024 cameras are also currently readily available and generate approximately 1,000,000 X-Y-Z data points for each view. Gauging accuracies are between 1/2000th and 1/5000th of the optical field-of-view for a 512×512 sensor. The gauging accuracies for a 1024×1024 CCD camera are between 1/4000th to 1/10,000th of the optical field-of-view. Higher density 2-D CCD cameras are becoming available which will also further enhance the objectives of the present invention. The camera field-of-view and projection area for the linear fringe pattern can be easily modified through a change of optics in the cameras and projector.

The sensor head optics are optimized for the linear fringe patterns. A slit aperture is used along the direction of the fringes in which the small cross-section width increases the depth-of-field of the projected fringe pattern. The slot length however supports a 1-D defocus throughout the gauging volume which blurs out the effects of dust particles that may be present on the fringe pattern in the projector. This permits the projector to operate in harsher industrial environments as well as to utilize fringe patterns in the projector of less quality and less cost then would be required for a projector with a circular aperture. The slit aperture also permits the transmission of more optical power than a circular aperture.

The method of processing also permits the use of special fringe pattern designs which can include linear compound fringes and both liner and pseudo-random fringe artifacts in the pattern to eliminate the requirement for the second (or third) CCD camera in the sensor head. These special fringe patterns are primarily used for large part areas which have slowly varying and smooth contours.

The present invention also includes the possibility of using an electro-optical fringe pattern generator with an LCD-type screen to electrically change patterns depending on the part configurations. These patterns can include the simple shifting of a linear fringe pattern for those cases in which the camera is held stationary with respect to the part or the changing to new patterns depending on the part surface characteristics (i.e., depending on whether the part surface is smooth or contains complex details).

The present invention introduces a new approach to Reverse-CAD system implementation. Instead of only a few measured points being gathered over a long period of time, an extremely large amount of X-Y-Z data (referred to as either a mesh or a "cloud") is collected almost instantaneously for each moire sensor view. The Reverse-CAD system of the present invention contains high-speed processors which immediately convert this data "cloud" from each view into the 3-D surface descriptors (e.g. Coon's Patch, Bezier Surfaces, B-Splines, Nurbs) that are typical for CAD systems. The resulting 3-D surfaces then be quickly regenerated for display on the CAD monitor for "real-time" or "on-line" review by the operator. These 3-D surface models can also provide information to a position control processor to automatically calculate and control the path and positions of the moire sensor views.

The real-time displays permit on-line interaction by the operator to redefine CAD parameters that will meet his particular CAD application and objectives. For each of the displays, the operator is provided a quality number establishing how close the just generated X-Y-Z 3-D surface model is to the actual measured X-Y-Z data. This will support his engineering decision on how accurate he wishes his CAD model to be relative to the measure part. Due to the speed of data collection in the invention and due to the density of data collected, this Reverse-Cad function is now practical through the direct operator interface with a real-time data display. Rules of thumb can be provided to this system for an automatic generation of the data for a completely automatic Reverse-CAD function or for an initial view by the operator.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIGS. 2b–2f depict various camera field-of-view images in FIG. 2a;

FIGS. 3b–3c depict different patterns projected by the two cameras in FIG. 3a;

FIG. 5b schematically illustrates the orientation of the cameras and projectors in an alternative embodiment of FIG. 2a;

DESCRIPTION OF THE PREFERRED EMBODIMENT

Figure 1:
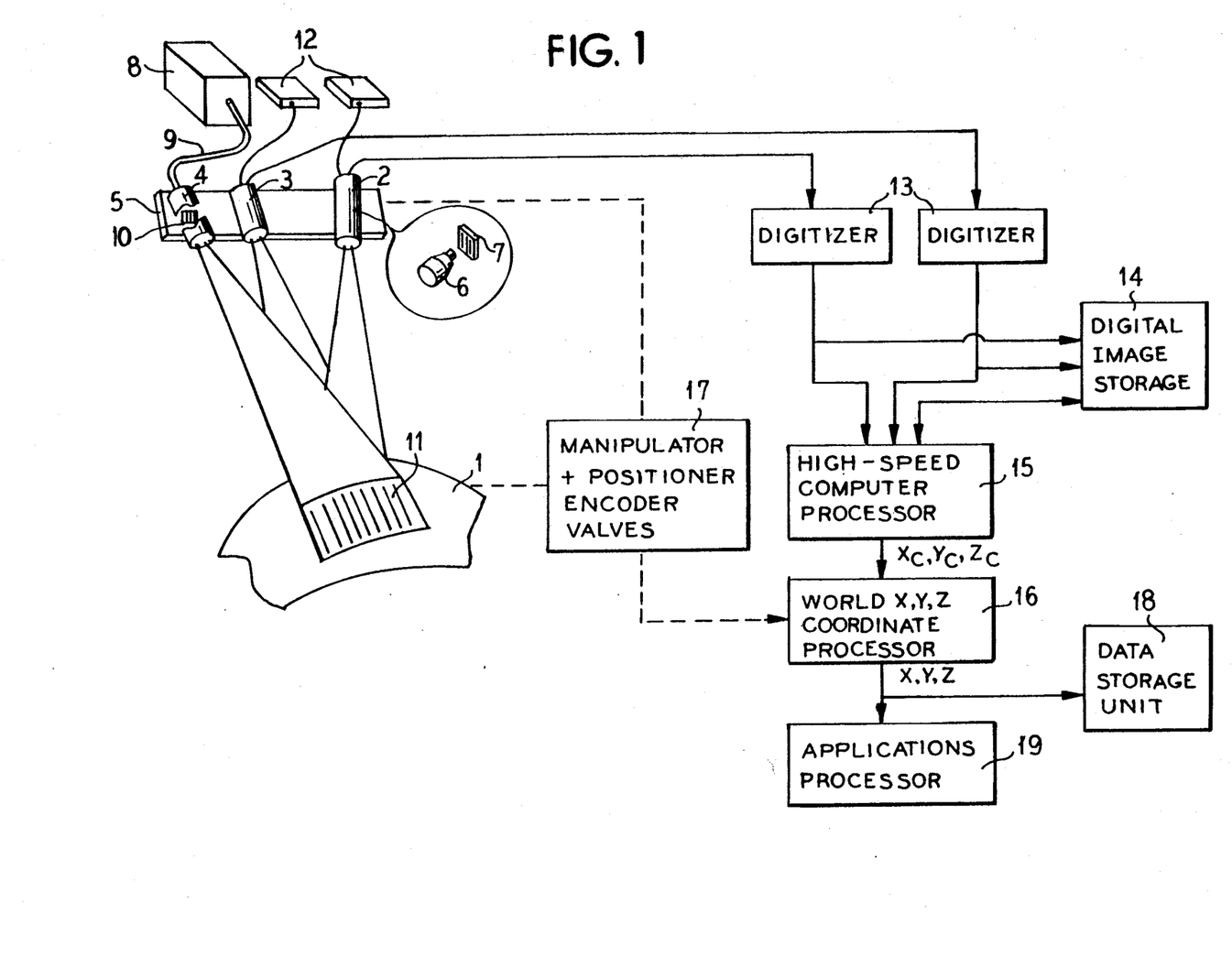
FIG. 1 is a schematic diagram depicting the high-speed three-dimensional surface measurement system of the present invention.

The present invention has general applicability, but is most advantageously utilized in a high-speed three-dimensional surface measurement system as depicted in FIG. 1.

The basic two camera moire processing technique of the present invention is illustrated in FIG. 1. The 3-D object 1 is viewed by two camera units, 2 and 3, and a single fringe pattern projector unit 4. These optical units are mounted on a rigid structure 5 which maintains the alignment of the optical units relative to each other throughout the surface measurement and data collection process. A manipulator (not shown) will either maneuver the optical structure 5 and/or the part 1 with respect to each other. A calibration and alignment process, generally performed off-line prior to actual part measurement, will uniquely determine the geometrical relationships of the camera and projector units relative to each other. The camera unit shown, such as camera unit 2, contains a standard imaging lens 6 and 2-D detector array device 7 such as a standard video CCD. No reference grating is required to be part of the camera unit. The projector unit shown utilizes a remote white light source 8 that transmits the light to the fringe pattern projector unit 4 via the fiber optic bundle 9 which illuminates a glass slide fringe pattern 10 which is then reimaged onto a surface patch 11 on the part 1. More detailed discussions of the projector unit optical design will follow.

The patch 11 of fringe patterns is viewed by the two camera units 2, 3. The slide fringe pattern 10 is typically implemented in glass as a series of clear and opaque linear fringes known as a Ronchi grating. In typical optical configurations, the line-of-sight (LOS) of camera unit 2 is positioned approximately normal to the surface of inspection. The projector unit 4 LOS is typically 30° to 90° from that of camera 2 LOS which can be referred to as the Fine Camera. Camera unit 3 also views essentially the same surface patch at a different angle from the projector 4 LOS and camera 2 LOS. Typically the camera unit 3, known as the Coarse Camera, is located such that its LOS angle is at least 3 or more from either the projector LOS or the Fine Camera LOS. These camera units 2, 3 are typically configured with remote electronic support units 12. These remote electronic support units 12 and projector white light source 8 permit a compact sensor package of projectors and cameras to be implemented in a rigid structure 5. Furthermore, the heat sources from these electronic support units and light power sources are located remote from the sensor package and thus permit more accurate gauging and less deleterious effects from thermal effects. The white light source 8 can be of either a continuous type or strobe type light source depending on the signal-to-noise requirements of the CCD units. The electronic support units for the CCD units typically include electronic shuttering to prevent blurring of the image if the sensor moves with respect to the part during the data collection process. The image can be further frozen onto the CCD arrays through the use of a strobe white light illuminator for source 8. Also source 8 can be replaced by a narrow spectral band visible laser, e.g. a HeNe, which supports the gauging of objects in bright daylight conditions. For this implementation, the camera units would incorporate standard narrow passband spectral filters in front of the camera CCD's. The fiber optic bundle 9 effectively removes the collimation properties from the laser to permit an eye safe operation since the laser light will scatter randomly from the illuminated surface.

As further illustrated in FIG. 1, the images which have been almost instantaneously stored on each CCD array for camera units 2 and 3 are electronically transmitted to independent digitizers 13, or a common digitizer, which in turn transmits the digitized data to either a digital image storage device 14 and/or high-speed computer processor 15. This computer architecture permits the rapid storage of a sequence of two-camera digital images at high data rates if the high-speed processor 15 is not computationally powerful enough to maintain processing at the pace of image collection. Current technology indicates that the sizing of the image storage device 14 is not critical due to the continually increasing processing speeds of the processor 15. The output of this high-speed computer processor is $x_c$, $y_c$, $z_c$ data in the sensor coordinate system. This data is further manipulated into part (or world) coordinates X-Y-Z with the world coordinate processor 16. This processor also requires data input from the sensor and/or part positioning devices 17. The output of the processor 16 is sent to a data storage unit 18 and/or applications processor 19. This applications processor is unique to the particular system application and can include 3-D dimensional validation, surface inspection, flaw detection and Reverse-CAD functions.

The high resolution fringe patterns projected on the inspection area 11 permits the generation of a high accuracy and high resolution X-Y-Z map. The course camera 3 views the same pattern and avoids the limitations of standard one camera moire techniques by uniquely determining the position of the fringe pattern when correlated with the view of the fine camera 2. A unique feature of the fixed fringe pattern techniques is that a high spatial resolution, related to the camera unit detector size, of the X-Y-Z surface map is achieved in directions along the linear fringe bands. The spatial resolution across the fringe pattern is somewhat less in that the associated spatial frequencies are limited by the principle fundamental projected fringe pattern frequency as identified by the Nyquest criteria.

Figure 9:
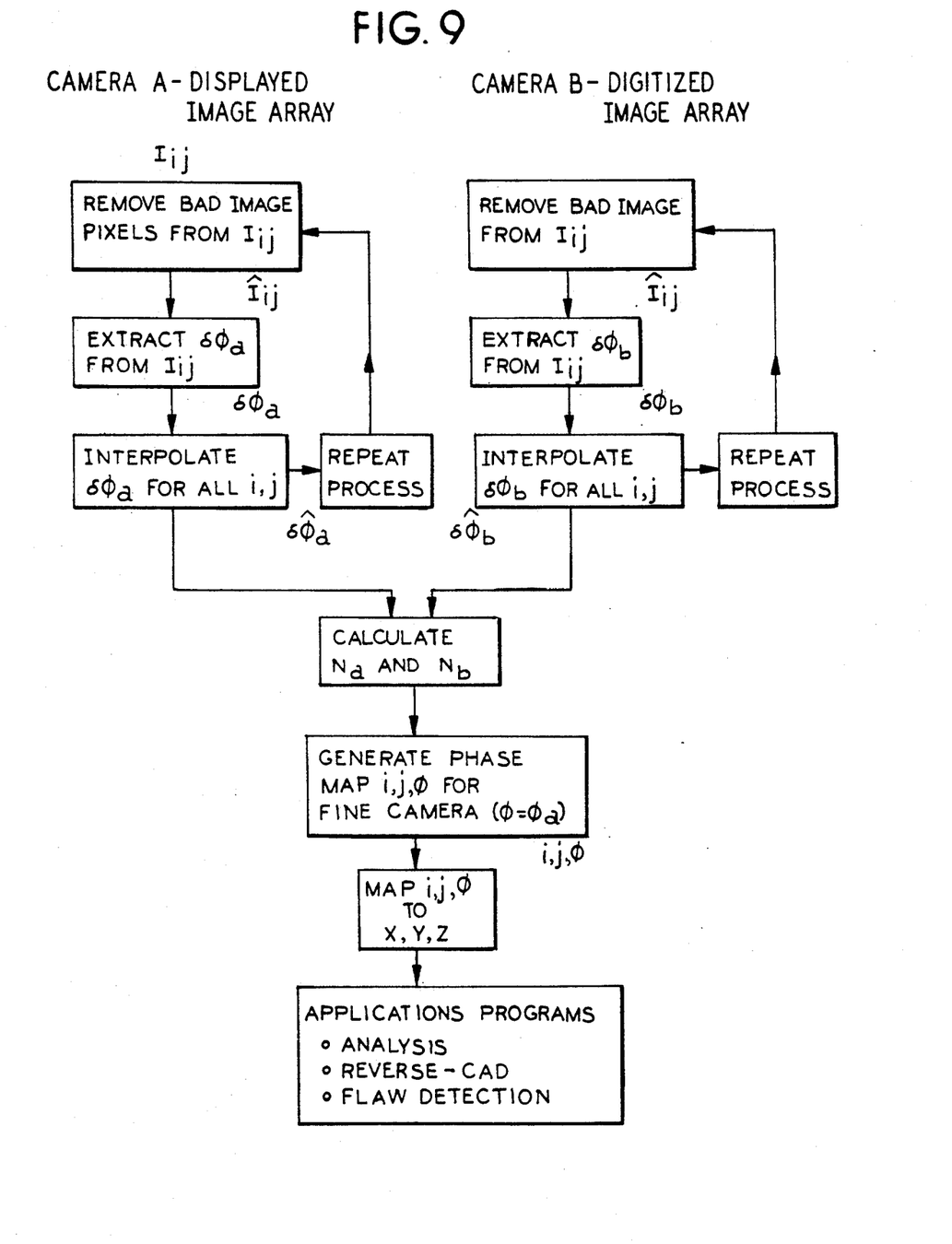
FIG. 9 is a flow chart of the steps of solving the "$2\pi$ problem".

The following is a solution for the "$2\pi$ problem" for the multi-camera implementation depicted in FIG. 1. A flow chart of the method is depicted in FIG. 9.

Consider the case of two cameras, A and B, and a single projector as part of the projection moire system. The phase map associated with each camera from a common object surface is designated CAM A: $i_a, j_a, \phi_a$ CAM B: $i_b, j_b, \phi_b$ (1)

where $i_a, j_a$ and $i_b, j_b$ are the camera pixel (image element, detector position, etc.) values for Cameras A and B respectively. The phase values $\phi_a$ and $\phi_b$ are in radians and indicate the amount of shift seen by each camera for the projected phase pattern. A $2\pi$ value relates to a full fringe shift as seen by the camera and, in fact, many fringe shifts may occur. Generally the "raw unfolded" phase first calculated from each camera A and B is $\delta\phi_a$ and $\delta\phi_b$ which is related to $\phi_a$ and $\phi_b$ as follows:

$$\phi_a = \delta\phi_a + 2\pi N_a + a$$

$$\phi_b = \delta\phi_b + 2\pi N_b + b \quad (2)$$

where $N_a$ and $N_b$ are integers. Selecting their proper values, which is known as the "$2\pi$ Problem", is a key issue in the design of a practical moire sensor system. $\eta_a$ and $\eta_b$ are the contributions of "noise" in the generation of the $\delta\phi_a$ and $\delta\phi_b$ values. Their standard deviations $\sigma_a$ and $\sigma_b$ are generally small fractions of $2\pi$ (such as $\sigma_a = \sigma_b \approx 2\pi/100$).

In the multi-camera technique of the present invention, the geometric relationships between all of the cameras and the projectors are known. Each camera is able to uniquely map its $i,j,\phi$ value to a x,y,z value associated with the part or world coordinate system. For Camera A:

$x = f_x(i_a, j_a, \phi_a)$ $y = f_y(i_a, j_a, \phi_a)$ $z = f_z(i_a, j_a, \phi_a)$ (3)

For Camera B:
$x = g_x(i_b, j_b, \phi_b)$ $y = g_y(i_b, j_b, \phi_b)$ $z = g_z(i_b, j_b, \phi_b)$ (4)

In this mathematical treatment, it will be assumed that the surface being viewed has its normal vector primarily in the Z direction (specifically within $\pm 45°$ of the Z-Axis). Since the following relationship holds:

$$f_z(i_a, j_a, \phi_a) = g_z(i_b, j_b, \phi_b) \quad (5)$$

it follows that $N_a$ is related to $N_b$. A method is now presented which provides a technique to uniquely determine $N_a$ (and $N_b$) from the $\delta\phi_a$ and $\delta\phi_b$ raw unfolded phase measurements.

Expression 5 can be written in polynomial form as:

$$a_0 + a_1\phi_a + a_2\phi_a^2 = b_0 + b_1\phi_b + b_2\phi_b^2 \quad (6)$$

where the a-coefficients are functions of $i_a, j_a$ and the b-coefficients are functions of $i_b, j_b$. The non-linear terms are generally small for most practical sensor implementations (with $a_2 << a_1$, and $b_2 << b_1$ and with $\phi_a$ and $\phi_b$ having maximum values of a few hundred radians). Thus the linear relationships from Equation (6) can be written as follows:

$$a_0 + a_1\phi_a = b_0 + b_1\phi_b$$

or $$(a_0 - b_0) + a_1\phi_a - b_1\phi_b = 0 \quad (7)$$

Let $N_a^*$ and $N_b^*$ be the true integers (generally unknown) which are candidate solutions to Equation (7) using the Equation (2) relationships. This is rewritten as follows:

$$(a_0 - b_0) + a_1\delta\phi_a - b_1\delta\phi_b = (-a_1 N_a^* + b_1 N_b^*) \cdot 2\pi - a_0\eta_a + b_1\eta_b \quad (8)$$

The noise terms, $\eta_a$ and $\eta_b$, are required to be much smaller than $2\pi$. A more precise condition will be identified shortly. The $2\pi$ Problem for the multi-camera case reduces to determine whether another $N_a$ and $N_b$ exists that satisfies the same relationship. This can be expressed as $$2\pi(-a_1 N_a^* + b_1 N_b^*) - a_1\eta_a + b_1\eta_b = 2\pi(-a_1 N_a + b_1 N_b) \quad (9)$$

This can be rearranged as $$\delta N_a = \frac{b_1}{a_1} \delta N_b + \eta_c \quad (10)$$

where $$\delta N_a = N_a - N_a^* \quad (11)$$

$$\delta N_b = N_b - N_b^*$$

$$\eta_c = \left(-\eta_a + \frac{b_1}{a_1}\eta_b\right)\frac{1}{2\pi}$$

This combination noise $\eta_c$ has a standard deviation of $$\sigma_c = \left[1 + \left(\frac{b_1}{a_1}\right)^2\right]^{\frac{1}{2}} (\sigma/2\pi) \quad (12)$$

where $\sigma_a = \sigma_b = \sigma$ has been assumed for the independent camera noise sources.

The ratio $b_1/a_1$ is the key to determining if a suitable dynamic range extension can be made to the Fine Camera, Camera A. That is, can Camera A operate unambiguously with $N_a$ values over the range:

$$-N_{max} \leq N_a \leq N_{max} \qquad (13)$$

where $N_{max}=5$ is typical. The ratio $b_1/a_1$ however depends on how Camera A and Camera B are oriented with respect to the projector. As an approximation, this relationship is $$a_1 = \frac{P_0}{2\pi} \frac{1}{\operatorname{Tan} \alpha_P - \operatorname{Tan} \alpha_A} \qquad (14)$$

$$b_1 = \frac{P_0}{2\pi} \frac{1}{\operatorname{Tan} \alpha_P - \operatorname{Tan} \alpha_B} \qquad (15)$$

or $$\frac{b_1}{a_1} = \frac{1 - \operatorname{Tan} \alpha_A / \operatorname{Tan} \alpha_P}{1 - \operatorname{Tan} \alpha_B / \operatorname{Tan} \alpha_P} \qquad (16)$$

where
- $\alpha_P$ = Projector angle with respect to Z-Axis
- $\alpha_A$ = Camera A angle with respect to Z-Axis
- $\alpha_B$ = Camera B angle with respect to Z-Axis
- $\alpha_O$ = Fringe Pattern period in object space A typical sensor configuration is for $\alpha_P=30°$ and $\alpha_A=0°$ (the Fine Camera aligned along the Z-Axis) with the Coarse Camera B angle $\alpha_B$ between 0° and 30°. If $\alpha_B=27°$ (Camera B close to the projector), then $b_1/a_1 \approx 11$. If $\alpha_B=3°$ (Camera B close to Camera A), then $b_1/a_1 \approx 1.1$. the exact ratio for $b_1/a_1$ is found from the calibration procedure. Whether $b_1/a_1$ is a permissible ratio depends on whether the noise-free case of Equation 10

$$\delta N_a = \frac{b_1}{a_1} \delta N_b \qquad (17)$$

has an integer for $\delta N_a$ and $\delta N_b$ solution other than $\delta N_a = \delta N_b = 0$ over the $N_a$ range of interest.

Consider the ratio $$\frac{b_1}{a_1} = \frac{NUM}{DEN} \qquad (18)$$

where DEN is the least common denominator for the ratio $b_1/a_1$. Then the closest non-zero integer solution is $$|\delta N_a| = NUM \qquad (19)$$

$$|\delta N_b| = DEN$$

If $NUM \geq 2N_{max}+1$, then a unique solution exists over the desired Fine Camera Range $(-N_{max} \leq N_a \leq N_{max})$ for a noise-free condition. For the real-world condition in which there is phase measurement noise (with standard deviation $\sigma$), the DEN value must satisfy the relationship $$\frac{1}{DEN} >> \sigma_c = \left[1 + \left(\frac{b_1}{a_1}\right)^2\right]^{\frac{1}{2}} \left(\frac{\sigma}{2\pi}\right) \qquad (20)$$

Note that 1/DEN is the minimum deviation of the term $(b_1/a_1)\delta N_b$ in Equation 10. This value must be larger than the noise term in that equation. Equation 20 can be satisfied in practice with a simpler constraint since the ratio $b_1/a_1 = NUM/DEN$ is always greater than unity:

$$\frac{1}{DEN} >> \frac{NUM}{DEN}\left(\frac{\sigma}{2\pi}\right) \qquad (21)$$

or $$NUM << \frac{2\pi}{\sigma} \qquad (22)$$

thus if the phase measurement noise was such that $\sigma=2\pi/100$, then NUM=11 is possible for a satisfactory and unique sensor solution over the $N_a$ range $-5 \leq N_a \leq 5$. a number of Camera B angular positions are possible with

DEN=1, 2, 3, 4, 5, 6, 7, 8, 9, 10

(or $\alpha_B \approx 27°$, 25°, 22.5°, 20°, 17.5°, 15°, 12°, 9°, 6°, 3°).
In the example discussed with $\sigma=2\pi/100$, a larger dynamic range may be possible with $\delta N_1 = NUM = 19$ (another prime number) with DEN=1 through 18 as possible integer values determined by the Camera B position. For this case, the $N_a$ range is $-9 \leq N_a \leq 9$.

This procedure is similarly used for the more non-linear conditions in Equation (6) and for the case when the ration $b_1/a_1$ has a stronger variation in the camera pixel positions $i_a$, $j_a$, $i_b$, $j_b$. In this latter case, the variation of $b_1/a_1$ is to be much less than the nominal 1/DEN term (similar to the noise inequality of Equation 20). This is generally easily satisfied for most geometric sensor configurations of interest and the noise constraints of Equation 20. For the non-linear case, candidate values for $N_a$ and $N_b$ can be found from Equation 6 and mathematical simulations or experiments can be conducted to establish the satisfactory unique solutions.

Figure 2A:
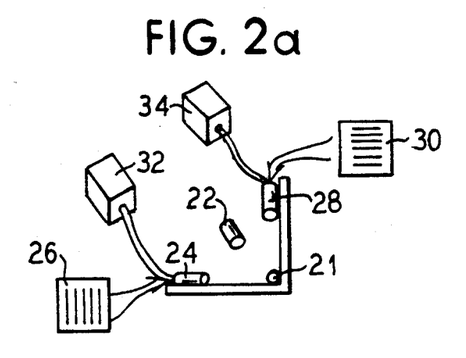
FIG. 2a is a schematic diagram depicting a two projector embodiment.
Figure 2B:
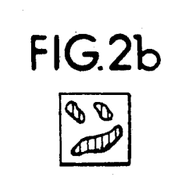
Figure 2C:
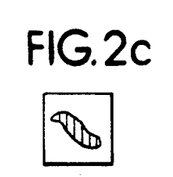
Figure 2D:
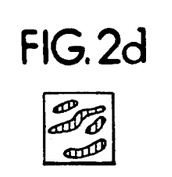
Figure 2E:
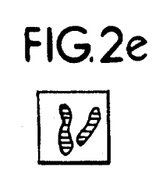
Figure 2F:
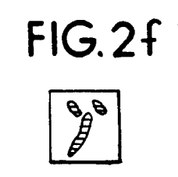

FIG. 2a illustrates a simple modification to the baseline FIG. 1 design in which high spatial resolutions can be achieved for part features and edges at various orientations. The Fine Camera 21, Coarse Camera 22 and projector 24 accomplish the same functions as the embodiment in FIG. 1 for the horizontally oriented fringe patterns 26. The linear fringes of the pattern are approximately in a direction orthogonal to the geometric plane that contains the Fine Camera 21 LOS and projector unit 24 LOS. Also it is not necessary for the Coarse Camera 22 to lie in this plane This benefit permits the incorporation of a second projector unit 28 which projects horizontal fringe patterns 30. Only one of the projectors 24 or 28 are in operation at any given moment. However camera units 21 and 22 will both simultaneously view either the vertical or horizontal projected fringes, 26 and 30. Electronic strobes or mechanical shutters can be utilize in the projector light power supplies, 32, 34 to permit a rapid switching between projectors 24, 28. The vertical fringe projector 24 is selected for those part edges that are orientated within approximately 45° of the horizontal direction as indicated in camera field-of-view (FOV) images depicted in FIGS. 2b, 2e and 2d. The horizontal fringe projector is selected for those part edges that are oriented approximately 45° of the vertical direction as indicated in camera FOV images depicted in FIGS. 2e and 2f. Only a few CCD detectors or pixels in the camera field-of-view for the CCD devices 21 and 22 are necessary to generate the high density X-Y-Z information for the surfaces being measured. Standard moire techniques which utilize only one camera and one projector with coded or compounded fringes would not accomplish the same small area high resolution function. This is because data over larger surface patches would be required to solve the $2\pi$ ambiguity problem discussed previously. Similarly, two camera stereometric techniques would not be suitable as the projected identification points are too sparsely populated to generate high resolution surface X-Y-Z data and 3-D maps.

Figure 3A:
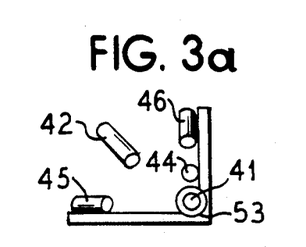
FIG. 3a is a schematic diagram depicting a three camera/two projector embodiment.
Figure 3B:
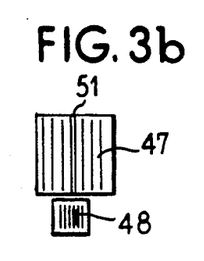
Figure 3C:
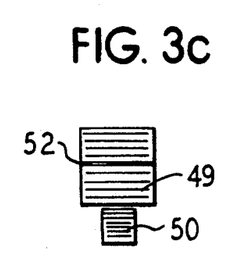

FIG. 3a is a further extension and a preferred embodiment of a general purpose moire sensor package. In addition to the Fine Camera 41 and Coarse Camera 42 which view a narrow field-of-view (NFOV) surface patch is an additional wide field-of-view (WFOV) camera 44 designed with optics to view a much larger surface patch. Each projector unit 45 and 46 will project two simultaneous side-by-side fringe patterns. The vertical fringe projector 45 projects a WFOV pattern 47 (FIG. 3b) as well as the NFOV pattern 48 (FIG. 3c). Similarly the horizontal fringe projector 46 projects both a WFOV pattern 49 (FIG. 3d) and a NFOV pattern 50 (FIG. 3e). The geometric positioning of these patterns are such that the NFOV Fine Camera 41 and NFOV Coarse Camera 42 will view either the small illuminated patterns 48 or 50 depending on which projector is selected. Although the small surface patches and fringe patterns are suitable to cover larger part surfaces which do not require high resolution surface maps, this would require additional part and/or sensor motion and data collection than for wider FOV moire sensor configurations. This is accomplished in this embodiment by the use of the WFOV Camera 44 which views the larger projected patterns 47 and 49. Since this is used for part surfaces which do not contain high resolution detail, it is possible to implement a compound fringe or coded pattern or to add artifacts such as the bright light line (typically 1.5 fringes wide, line 51 in pattern 47, line 52 in pattern 49) to avoid the $2\pi$ ambiguity problem. This implementation does not require the use of an additional WFOV "Coarse" Camera. The embodiment in FIG. 3a also includes a fiber optic light source 53 to provide general illumination of the part for other machine vision inspection applications. A ring light source 53 is the preferred implementation as illustrated in FIG. 3a as the white light illuminator optical axis is along that of the NFOV Fine Camera 41. This permits a more accurate location of shadow edges, holes, ridges, etc. using standard machine vision edge finding techniques which are unrelated to the moire 3-D surface gauging techniques. During utilization of the white light source, the projectors 45 and 46 are turned off.

An important feature in the physical implementations of the moire sensor heads described in FIGS. 1, 2 and 3a is the small size to permit both speed and ease of manipulation by simple mechanical mechanisms. The CCD camera heads and miniature imaging lenses that makeup the camera units are readily available to meet this objective. The projector units using standard techniques can become potentially quite large in accomplishing the functions of projecting high density fringes with enough resolution, contrast and light intensity to permit successful image collection by the camera units. The invention includes a projector design illustrated in FIG. 4a to accomplish these functions in a small optical package. The elements of this design are described as follows. The effective light source 61 is the transmitting end of the fiber optic bundle 62 which connects to a remote light bulb 63 and power supply 64. The fiber optic bundle 62 helps remove the infrared heat from the light 63 so that it does not reach the projector optics. The typical bulb 63 used in the light source contains its own condenser lens 65 which collimates the beam to the optical bundle receiving end 67. A optical filter or heat mirror 68 can be placed in front of the optical bundle to further remove infrared heat from the power supply.

Figure 4A:
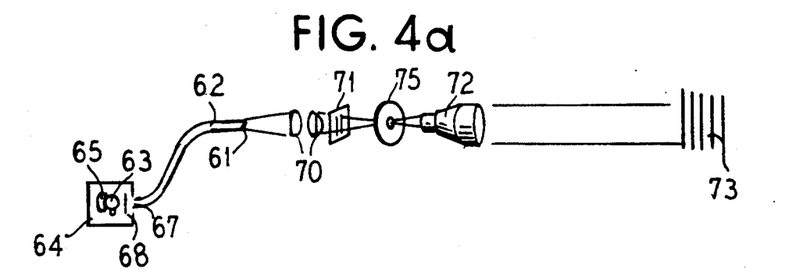
FIG. 4a is a schematic illustration of a projector embodiment of the present invention.
Figure 4B:
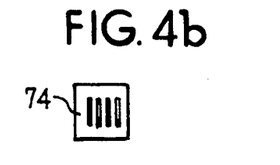
FIGS. 4b and 4e depict a RONCHI grating and a modified RONCHI grating for use in the FIG. 4a embodiment.

Light expands from the output of the fiber optic bundle 62 to fill the condenser lens elements 70. A fringe pattern glass slide 71 or other pattern generation device is located in close proximity to the condenser lens 70. The light refocuses onto the projector imaging optics 72. These imaging optics 72 refocus the fringe pattern 71 onto the part surface resulting in the projected fringe pattern 73. Ideally the projected pattern 73 should consist of perfectly collimated light and dark fringes with no variations in the pattern from the original fringe pattern 71. A standard high density fringe pattern is the Ronchi grating 74 (FIG. 4b) which consists of linear interlaced equally spaced clear and opaque bands. A pinhole aperture 75 that is generally located within a multi-element imaging lens set 72 accomplishes several important functions. One is that the small size of the aperture permits a larger depth-of-field in the projected pattern so that it maintains focus over the part surface even though the projector is not orthogonal to the surface. The second function is that the small pinhole 75 will effectively remove any dust spots or other small imperfections in this pattern. The drawback to utilizing the pinhole aperture is that a substantial amount of light may be lost in many applications. If this type of aperture is utilized, it may be necessary to use a more powerful light source and larger condenser lenses 70 to provide the necessary optical illumination power. The increased size of the circular condenser lens 70 would directly impact the size of the projector unit.

Figure 4C:
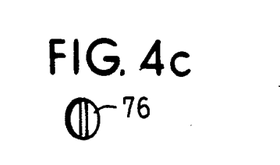
FIG. 4c depicts a slit aperture for use in the FIG. 4a embodiment.
Figure 4D:
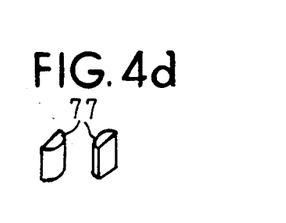
FIG. 4d depicts a cylindrical condensor lens system for use in the FIG. 4a embodiment.
Figure 4E:
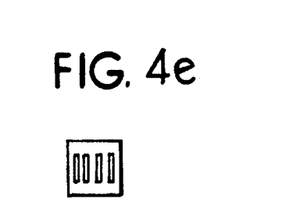

An alternative approach is to utilize a slit aperture 76 (FIG. 4c) with the slit dimension in the direction of the fringe patter and a cylindrical implementation 77 of the condenser lenses 70 (FIG. 4d) which will permit substantially more light to transmit through the system. This results in a smaller condenser lens and a more compact projector unit. The long slit length in slit aperture 76 will effectively create a defocus along the length of each individual fringe, but not across the fringe pattern. Thus the long depth-of-field is maintained since the slot width is the same as the diameter for the pinhole aperture 75. The defocus in the direction of the fringes will not deteriorate the quality of the fringes over the depth-of-field. In fact the quality of the projected pattern 73 will be improved since the 1-D defocus will effectively smooth any blemishes or dirt that would appear on each fringe of fringe pattern 71. For those applications in which the imaging projector optics 72 are selected to generate extremely small projected patterns 73, the fundamental frequency of the Ronchi grating 74 when projected may be close to the optical diffraction limit determined by the pinhole diameter or the narrow width of the single slit aperture. A modification of the Ronchi grating to form the projected linear fringe pattern 73 will improve contrast. This modification would be similar to the standard Ronchi grating of interlaced clear and opaque bands. However, instead of equally spaced bands, the opaque bands would be approximately 75% of the fringe period with the clear bands approximately 25% as illustrated by FIG. 4e. Although there is a loss of light in this configuration as compared to the standard Ronchi grating, this is compensated by the increased contrast in transmission and the use of a slit aperture 76 and cylindrical condenser lens 77.

Figure 5A:
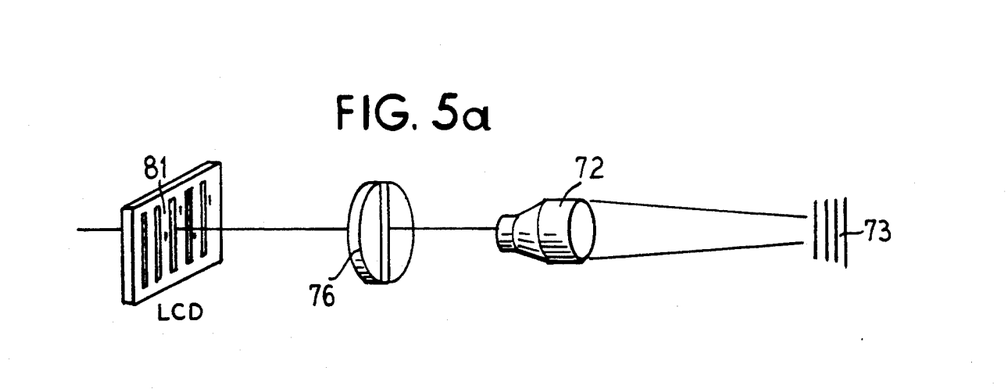
FIG. 5a is a schematic illustration of an alternative embodiment of the FIG. 4a projector.
Figure 5B:
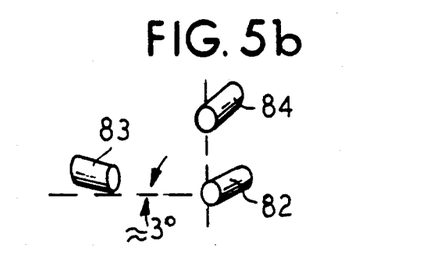

FIG. 5a illustrates a modification to the projector of FIG. 4a in which the fixed fringe pattern glass slide 71, of either the standard Ronchi-type or modified Ronchi-type, is replaced by a liquid crystal display (LCD) or equivalent electronically controlled transmissive (or reflective) device 81. These LCD devices inherently do not have the optical quality and straightness of the standard fixed fringe Ronchi gratings, but have the convenience of being able to electronically change patterns to support both phase shift moire techniques and multi-fringe pattern projection techniques. These LCD patterns can also be frozen to support the fixed pattern moire techniques in both horizontal and vertical configurations. For example, the horizontal and vertical fringe projector of FIG. 2a can be replaced by a single electronically controlled LCD projector 82 or equivalent, including reflective-type implementations, and two camera units 83 and 84. For vertical fringe patterns, camera unit 83 would be the Fine Camera and camera unit 84 would be the Coarse Camera. For horizontal fringe patterns, camera unit 84 would be the Fine Camera and camera unit 83 would be the Coarse Camera. It would be only necessary that the geometric plane that contains the projector unit 82 optical LOS and camera unit 83 optical LOS be offset approximately 3° from the almost orthogonal placement of projector unit 82 LOS and camera unit 84 LOS. An angle between 30° to 60° would normally separate the camera unit 83 LOS from the projector unit 82 LOS. Similarly 30° to 60° would separate the camera 84 LOS from the projector unit 82 LOS. To compensate for the anomalies in the LCD 81, the single slit aperture 76, that was previously discussed in FIG. 4a, is utilized. This would effectively blur all anomalies along the direction of each fringe to permit a reimaging of an ideal projected fringe pattern 73 on the part surface by the projector imaging optics 72.

Figure 6:
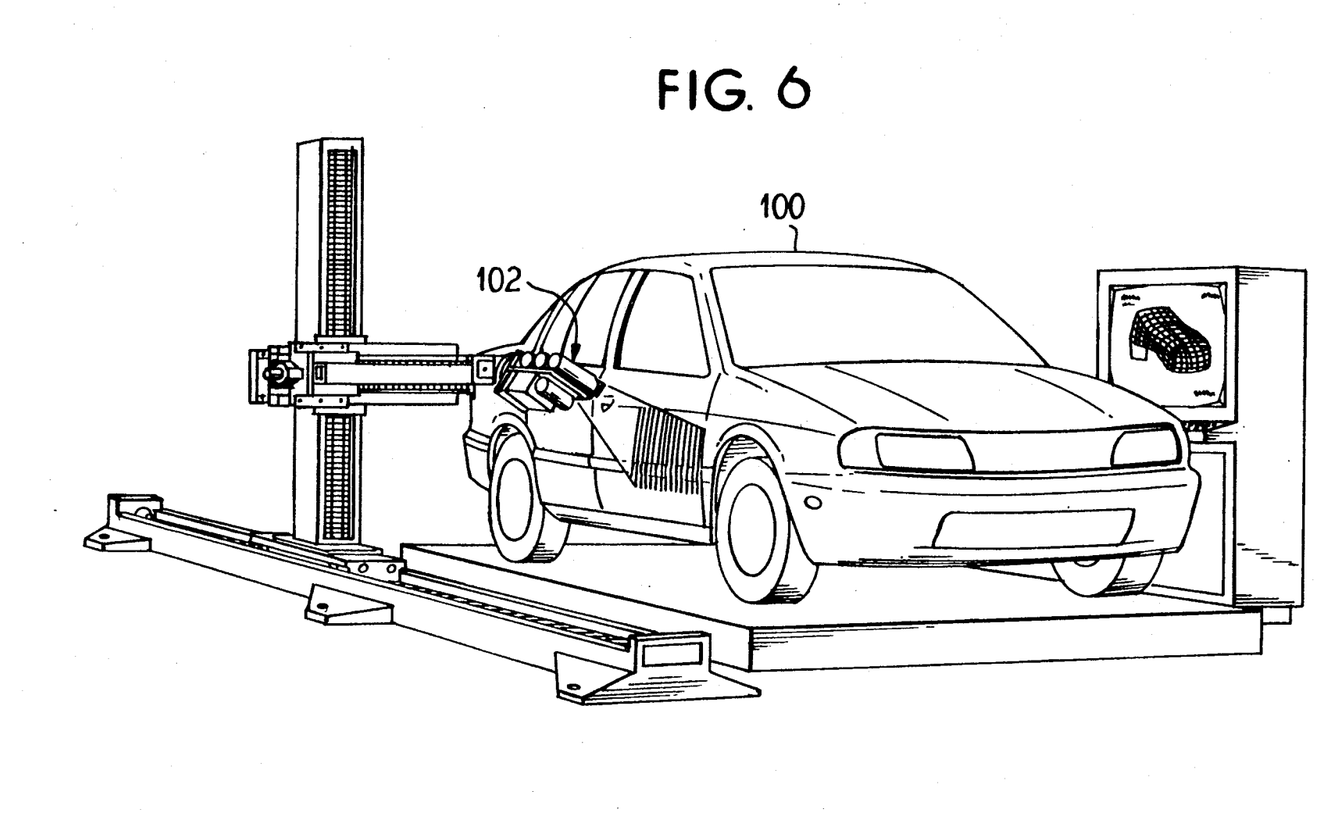
FIG. 6 is a perspective view of an embodiment in which the part is stationary and the sensor is moved.
Figure 7:
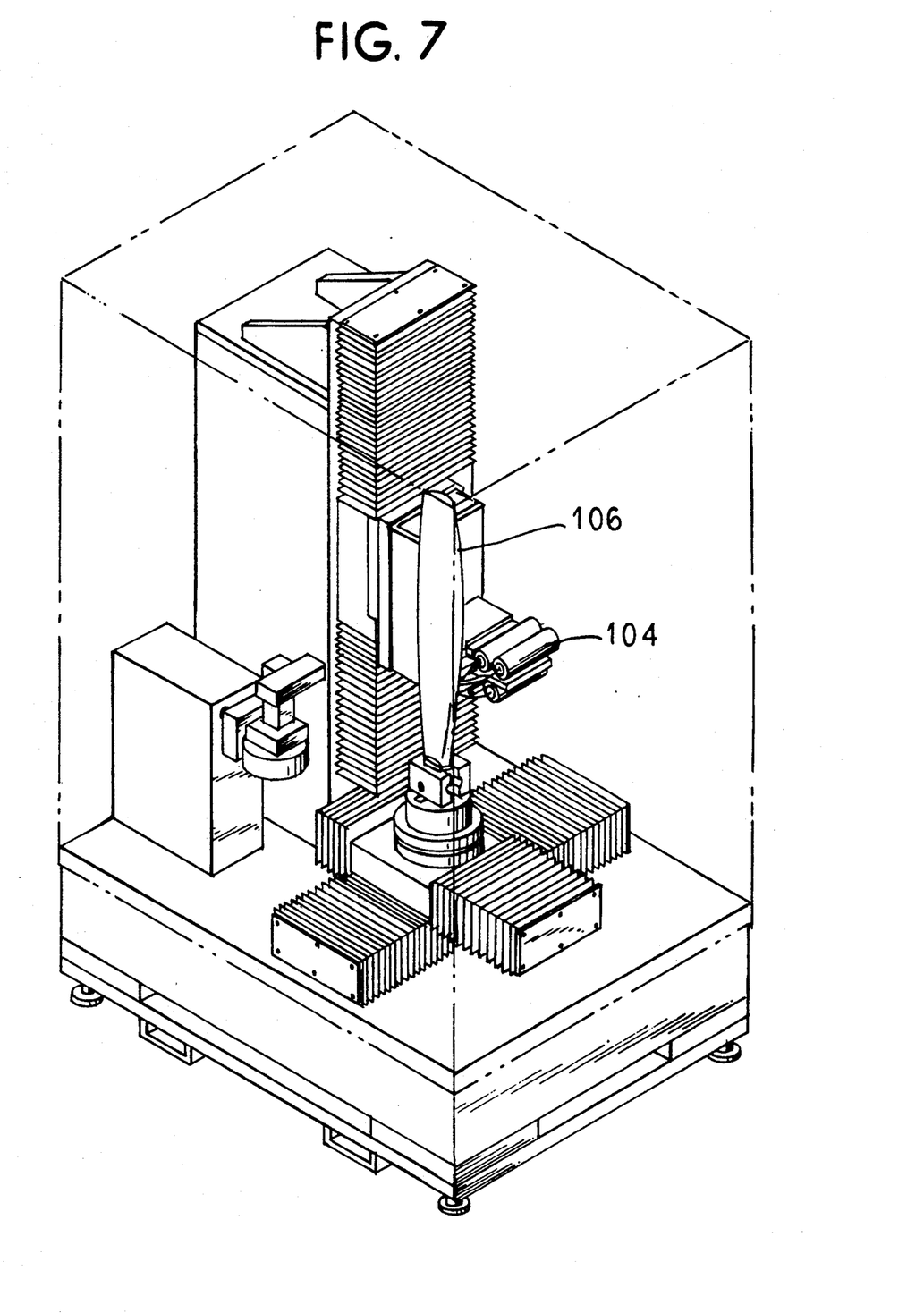
FIG. 7 is a perspective view of an embodiment in which both the part and the sensor are moved.
Figure 8:
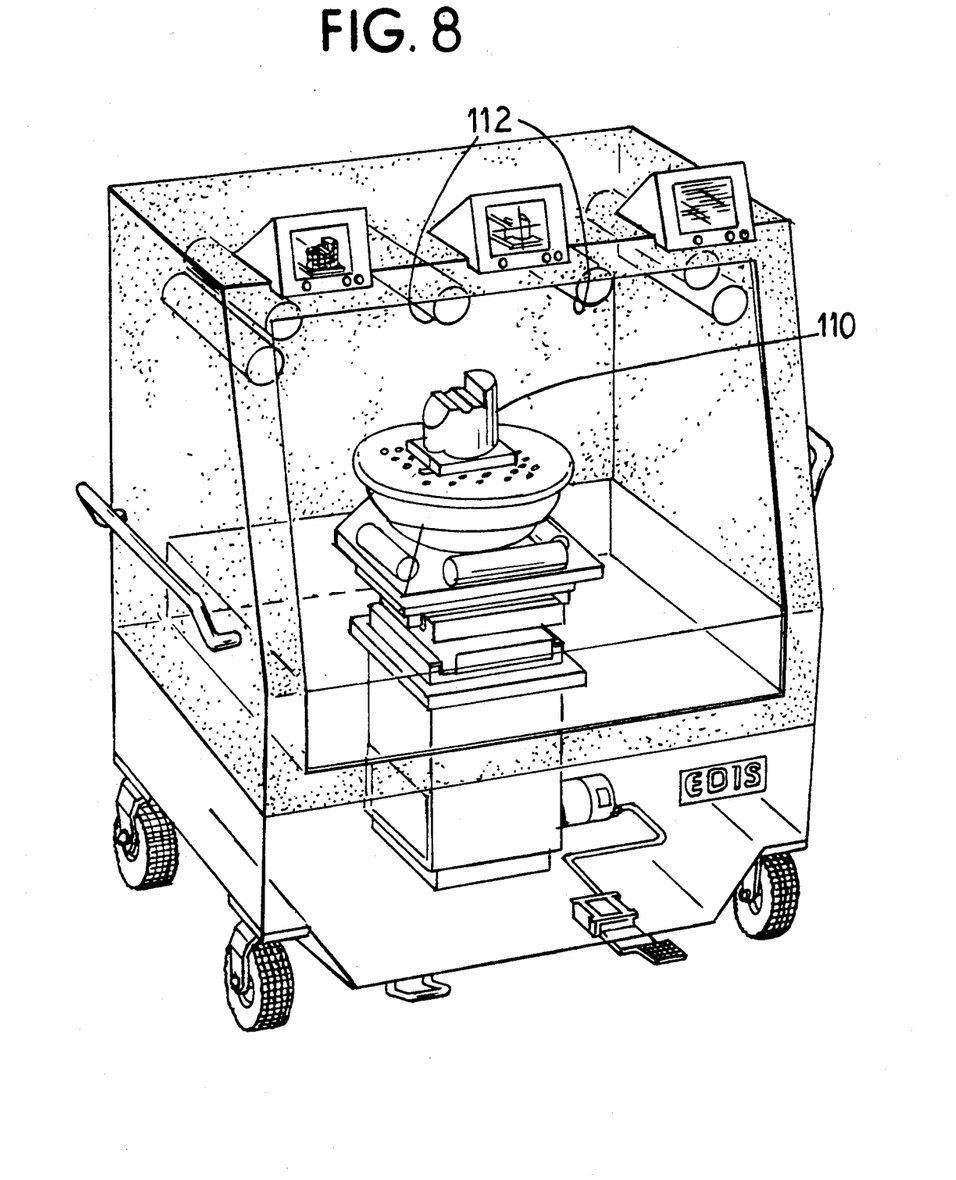
FIG. 8 is a perspective view of an embodiment in which the part is moved and the sensor is stationary.

The multi-camera sensor techniques of the present invention will support a number of inspection system mechanical configurations as illustrated in FIGS. 6, 7 and 8. FIG. 6 illustrates a system application in which the object 100 to be measured is completely stationary with the sensor 102 manipulated through the necessary angles to provide complete measurement surface coverage. The compact sensor packages resulting from this invention support the rapid manipulation of the sensor 102. Furthermore the ability to rapidly generate X-Y-Z surface patch data without requiring the positioner to stop relative to the object surface will greatly enhance the speed of surface mapping and data collection. This feature permits on-line interaction with CAD-engineers and others who will be able to analyze the X-Y-Z data on-line as the measurements are being made. The interaction of this engineer with the measurement systems and equipment can permit on-line changes and variation in the measurement process. FIG. 7 illustrates a system modification in which the mechanical positioners are divided between the sensor unit 104 and the part 106 being measured. FIG. 8 illustrates another system modification in which the part 110 is the only item manipulated with respect to the stationary sensors 112. All the principles of operation resulting from the present invention remain the same for each of the system implementations.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A high-speed three-dimensional surface measurement system for use in determining the surface of an object from at least two electronic signals, comprising:

at least first means for illuminating at least a surface area of the object with at least one fringe pattern;

at least two means for receiving reflected illumination from said surface area, each of said at least two means for receiving reflected illumination having a predetermined spacial orientation relative to said means for illuminating, a primary means of said two means for receiving reflected illumination having a line-of-sight that forms a primary angle relative to a line-of-sight of said means for illuminating and a secondary means of said two means for receiving reflected illumination having a line-of-sight that forms a secondary angle relative to said line-of-sight of said means for illuminating, said secondary angle being different than said primary angle; and said primary means providing a primary electronic signal representative of reflected illumination received thereby and said secondary means providing a secondary electronic signal representative of reflected illumination received thereby.

2. The system according to claim 1, wherein said first means for illuminating has a Ronchi grating through which illumination passes to produce said fringe pattern on said surface area of said object.

3. The system according to claim 1, wherein said first means for illuminating has a modified Ronchi grating through which illumination passes to produce said fringe pattern on said surface of said object, said modified Ronchi grating having alternating opaque and clear bands wherein said opaque bands are wider than said clear bands.

4. The system according to claim 3, wherein said opaque bands are approximately three time wider than said clear bands.

5. The system according to claim 1, wherein said first means for illumination has means for producing a variable fringe grating.

6. The system according to claim 5, wherein said means for producing a variable fringe grating is a liquid crystal display for forming patterns of illumination having transmissive and non-transmissive areas.

7. The system according to claim 1, wherein said primary means is a fine video camera such that said primary electronic signal contains at least information regarding a plurality X, Y, and Z points on said surface area and wherein said secondary means is a coarse video camera wherein said secondary electronic signal contains at least information for uniquely determining the position of the fringe pattern on the surface area when correlated with said information from said fine video camera.

8. The system according to claim 1, wherein said primary means is oriented approximately normal to said surface area and said primary angle is in the range of 19° to 90°, and wherein said secondary means is oriented such that line-of-sight of said secondary means forms a separation angle of at least 3° with said line-of-sight of said primary means.

9. The system according to claim 1, wherein said system has a remotely located source of illumination connected to said means for illuminating via a fiber optic line.

10. The system according to claim 1, wherein said means for illuminating provides continuous illumination.

11. The system according to claim 1, wherein said means for illumination provides strobed illumination.

12. The system according to claim 1, wherein said means for illumination has a narrow spectral band visible laser and wherein each of said at least two means for receiving reflected illumination have narrow passband spectral filters.

13. The system according to claim 1, wherein said means for illumination has a strobe white light illuminator.

14. The system according to claim 1, wherein said system further comprises a second means for illuminating said surface area of said object with at least one fringe pattern; said second means for illuminating having a line-of-sight oriented differently than said line-of-sight of said first means for illuminating; said first means for illuminating projecting a vertical fringe pattern and said second means for illuminating projecting a horizontal fringe pattern, and wherein said vertical and horizontal fringe patterns are alternately projected onto said surface areas.

15. The system according to claim 14, wherein said system further comprises means for selecting said first means for illuminating responsive to part edges of said surface area oriented with approximately 45° of a horizontal direction as indicated in a field of view of said at least two means for receiving reflected illumination and means for selecting said second means for illuminating response to part edge of said surface area oriented within 45° of a vertical direction as indicated in a field of view of said at least two means for illumination.

16. The system according to claim 1, wherein said system further comprises a second means for illuminating said surface area of said object with at least one fringe pattern, said second means for illuminating having a line-of-sight oriented differently than said line-of-sight of said first means for illuminating, said first means for illuminating projecting simultaneously two vertical side-by-side fringe patterns and said second means for illuminating projecting simultaneously two horizontal side-by-side fringe patterns, wherein for each of said side-by-side fringe patterns one is a narrow field-of-view fringe pattern and the other is a wide field-of-view fringe pattern; and wherein said system further comprises a third means for receiving reflected illumination; said third means having a wide field-of-view for viewing the wide field-of-view fringe patterns and said primary and secondary means each having a narrow field-of-view for viewing said narrow field-of-view fringe patterns.

17. The system according to claim 1, wherein said at least first means for illuminating comprises a means for providing a beam of illumination, means for collimating the beam of illumination, means for providing a fringe grating through which the collimate beam of illumination passes, means for increasing the depth-of-field of said fringe patten on said surface area and means for focusing the fringe pattern on said surface area.

18. The system according to claim 17, wherein said means for collimating the beam of illumination is a condenser lens.

19. The system according to claim 17, wherein said means for increasing the depth-of-field is a pinhole aperture.

20. The system according to claim 17, wherein said means for collimating the beam of illumination is a cylindrical condenser lens and wherein said means for increasing the depth-of-field is a slit aperture oriented parallel to said means for providing a grating, said fringe grating being a plurality of alternating opaque and clear substantially straight line bands.

21. The system according to claim 17, wherein said means for providing a fringe pattern is a Ronchi grating.

22. The system according to claim 17, wherein said means for providing a fringe pattern is a modified Ronchi grating having alternating opaque and clear bands, and wherein said opaque bands are wider than said clear bands.

23. The system according to claim 22, wherein said opaque bands are approximately three times wider than said clear bands.

24. The system according to claim 17, wherein said at least one means for providing a fringe pattern is a liquid crystal display for forming different patterns of illumination having transmissive and non-transmissive areas.

25. The system according to claim wherein said system further comprises means for supporting in a stationary position said at least first means for illuminating and said two means for receiving reflected illumination relative to a position of said object, said object being moveable.

26. The system according to claim 1, wherein said system further comprises means for moving said at least first means for illuminating and said at least two means for receiving reflected illumination relative to said object, said object being stationary.

27. The system according to claim 1, wherein said system further comprises means for moving said object relative to said at least first means for illuminating and said at least two means for receiving reflected illumination, and wherein said system further comprises means for moving said at least first means for illuminating and said at least two means for receiving reflected illumination.

28. A high-speed three-dimensional surface measurement system for use in determining the surface of an object from at least two electronic signals, comprising:
first means for illuminating at least a surface area of the object with two vertical side-by-side fringe patterns;
second means for illuminating said surface area of said object with two horizontal side-by-side fringe patterns, for each of said side-by-side vertical and horizontal fringe patterns, one is a narrow field-of-view fringe pattern and the other is a wide field-of-view fringe pattern;
at least three means for receiving reflected illumination from said surface area, each of said at least three means for receiving reflected illumination having a predetermined spacial orientation relative to said first means for illuminating, a primary means of said three means for receiving reflected illumination having a line-of-sight that forms a primary angle relative to a line-of-sight of said first means for illuminating and a secondary means of said three means for receiving reflected illumination having a line-of-sight that forms a secondary angle relative to said line-of-sight of said first means for illuminating, said secondary angle being different than said primary angle, said second means for illuminating having a line-of-sight oriented differently than said line-of-sight of said first means for illuminating;

said third means having a wide field-of-view for viewing the wide field-of-view fringe patterns and said primary and secondary means each having a narrow field-of-view for viewing the respective narrow field-of-view fringe patterns;

said primary means providing a primary electronic signal representative of reflected illumination received thereby and said secondary means providing a secondary electronic signal representative of reflected illumination received thereby.

29. The system according to claim 28, wherein said primary means is a fine video camera such that said primary electronic signal contains at least information regarding a plurality X, Y, and Z points on said surface area and wherein said secondary means is a coarse video camera such that said secondary electronic signal contains at least information for uniquely determining the position of the fringe pattern on the surface area when correlated with said information from said fine video camera.

30. The system according to claim 28, wherein said primary means is oriented approximately normal to said surface area and said primary angle is in the range of 19° to 90°, and wherein said secondary means is oriented such that line-of sight of said secondary means forms a separation angle of at least 3° with said line-of-sight of said primary means.

31. A high-speed three-dimensional surface measurement system for use in determining the surface of an object from at least two electronic signals, comprising:
first means for illuminating at least a surface area of the object with at least one first fringe pattern;
second means for illuminating said surface area of said object with at least one second fringe pattern;
at least two means for receiving reflected illumination from said surface area, each of said at least two means for receiving reflected illumination having a predetermined spacial orientation relative to said first and second means for illuminating, a primary means of said two means for receiving reflected illumination having a line-of-sight that forms a primary angle relative to a line-of-sight of said first means for illuminating and a secondary means of said two means for receiving reflected illumination having a line-of-sight that forms a secondary angle relative to said line-of-sight of said first means for illuminating, said secondary angle being different than said primary angle;
said second means for illuminating having a line-of-sight oriented differently than said line-of-sight of said first means for illuminating; and
said primary means providing a primary electronic signal representative of reflected illumination received thereby and said secondary means providing a secondary electronic signal representative of reflected illumination received thereby.

32. The system according to claim 31, wherein said first means for illuminating projects a vertical fringe pattern and said second means for illuminating projects a horizontal fringe pattern, and wherein said vertical and horizontal fringe patterns are alternately projected onto said surface area.

33. The system according to claim 31, wherein said system further comprises means for selecting said first means for illuminating responsive to part edges of said surface area oriented within approximately 45° of a horizontal direction as indicated in a field-of-view of said at least two means for receiving reflected illumination and means for selecting said second means for illuminating response to part edge of said surface area oriented within approximately 45° of a vertical direction as indicated in a field of view of said at least two means for illumination.

34. The system according to claim 31, wherein said primary means is a fine video camera such that said primary electronic signal contains at least information regarding a plurality X, Y, and Z points on said surface area and wherein said secondary means is a coarse video camera such that said secondary electronic signal contains at least information for uniquely determining the position of the fringe pattern on the surface area when correlated with said information from said fine video camera.

35. The system according to claim 31, wherein said primary means is oriented approximately normal to said surface area and said primary angle is in the range of 19° to 90°, and wherein said secondary means is oriented such that line-of-sight of said secondary means forms a separation angle of at least 3° with said line-of-sight of said primary means.

36. A high-speed three-dimensional surface measurement system for use in determining the surface of an object from at least two electronic signals, comprising:
at least first means for illuminating at least a surface area of the object with a fringe pattern, said at least first means for illuminating having a means for providing a beam of illumination, means for collimating the beam of illumination, means for providing a fringe grating through which the collimated beam of illumination passes, means for increasing the depth-of-field of said fringe pattern on said surface area and means for focusing the fringe pattern on said surface area;
at least two means for receiving reflected illumination from said surface area, each of said at least two means for receiving reflected illumination having a predetermined spacial orientation relative to said means for illuminating, a primary means of said two means for receiving reflected illumination having a line-of-sight that forms a primary angle relative to a line-of-sight of said means for illuminating and a secondary means of said two means for receiving reflected illumination having a line-of-sight that forms a secondary angle relative to said line-of-sight of said means for illuminating, said secondary angle being different than said primary angle; and
said primary means providing a primary electronic signal representative of reflected illumination received thereby and said secondary means providing a secondary electronic signal representative of reflected illumination received thereby.

37. The system according to claim 34, wherein said means for collimating the beam of illumination is a condenser lens.

38. The system according to claim 34, wherein said means for increasing the depth-of-field is a pinhole aperture.

39. The system according to claim 34, wherein said means for collimating the beam of illumination is a cylindrical condenser lens and wherein said means for increasing the depth-of-field is a slit operative oriented parallel to said means for providing a grating, said fringe grating being a plurality of alternating opaque and clear substantially straight line bands.

40. The system according to claim 34, wherein said means for providing a fringe pattern is a Ronchi grating.

41. The system according to claim 34, wherein said means for providing a fringe pattern is a modified Ronchi grating having alternating opaque and clear bands, and wherein said opaque bands are wider than said clear bands.

42. The system according to claim 39, wherein said opaque bands are approximately three times wider than said clear bands.

43. A high-speed three-dimensional surface measurement system or use in determining the surface of an object from at least two electronic signals, comprising:
at least first means for illuminating at least a surface area of the object with at least one fringe pattern, said at least first means for illuminating having source means for providing light, cylindrical condenser lens arrangement that receives light from the source means and refocuses the light onto projector imaging optics, pattern means for generating a substantially parallel line fringe pattern located in close proximity to an output side of the cylindrical condenser lens arrangement, and slit aperture means located between the pattern means and the projector imaging of optics for providing a defocus along the length of each individual fringe of the fringe pattern without causing a defocus across the fringe pattern;
at least two means for receiving reflected illumination from said surface area, each of said at least two means for receiving reflected illumination having a predetermined spacial orientation relative to said means for illuminating, a primary means of said two means for receiving reflected illumination having a line-of-sight that forms a primary angle relative to a line-of-sight of said means for illuminating and a secondary means of said two means for receiving reflected illumination having a line-of-sight that forms a secondary angle relative to said line-of-sight of said means for illuminating, said secondary angle being different than said primary angle; and
said primary means providing a primary electronic signal representative of reflected illumination received thereby and said secondary means providing a secondary electronic signal representative of reflected illumination received thereby.

44. A method for determining the surface of an object in a high-speed three-dimensional surface measurement system, comprising the steps of:
illuminating with at least first means for illuminating at least a surface area of the object with at least one fringe pattern;
providing at least two cameras receiving reflected illumination from said surface area, each of said at least two cameras for receiving reflected illumination having a predetermined spacial orientation relative to said means for illuminating, a fine camera of said two cameras for receiving reflected illumination having a line-of-sight that forms a primary angle relative to a line-of-sight of said means for illuminating and a coarse camera of said two cameras for receiving reflected illumination having a line-of-sight that forms a secondary angle relative to said line-of-sight of said means for illuminating, said secondary angle being different than said primary angle;
providing three dimensional part coordinates indicative of the relation of the object to the fine and coarse cameras;
outputting a primary set of pixel coordinates and phase values from said fine camera;
outputting a secondary set of pixel coordinates and phase values from said coarse camera;
for each of the primary and secondary sets extracting primary and secondary raw unfolded phase values, respectively, from the pixel coordinates of the primary and secondary sets;
calculating first and second true integer values using the primary and secondary raw unfolded phase values and the pixel coordinates of the primary and secondary sets;
generating a phase map for the fine camera using the first and second true integer values; and
mapping the phase map onto a part map using the part coordinates to produce a final three dimensional coordinate set representative of the surface area of the object.

45. The method according to claim 44, wherein the method further comprises the step of performing a reverse - CAD operation by forming a representative surface description of the surface area of the object using the final three dimensional coordinate set.

* * * * *